United States Patent
Rokey et al.

(10) Patent No.: US 7,635,217 B2
(45) Date of Patent: Dec. 22, 2009

(54) EXTRUDER HAVING VARIABLE MID-BARREL RESTRICTION AND ADJACENT HIGH INTENSITY MIXING ASSEMBLY

(75) Inventors: Galen J. Rokey, Sabetha, KS (US);
Brian S. Plattner, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 181 days.

(21) Appl. No.: 11/969,207

(22) Filed: Jan. 3, 2008

(65) Prior Publication Data

US 2009/0175120 A1   Jul. 9, 2009

(51) Int. Cl.
*B29B 7/48* (2006.01)
*B29B 7/74* (2006.01)

(52) U.S. Cl. .............................. 366/80; 366/85; 366/88; 366/90; 366/91

(58) Field of Classification Search ............. 366/79–80, 366/82–85, 88–90, 91; 425/200–209
See application file for complete search history.

(56) References Cited

U.S. PATENT DOCUMENTS

| | | | | |
|---|---|---|---|---|
| 3,070,836 A | * | 1/1963 | De Haven et al. | 264/40.7 |
| 3,360,824 A | * | 1/1968 | Schippers | 366/76.92 |
| 3,419,250 A | * | 12/1968 | Brennan, Jr. | 366/196 |
| 3,870,285 A | * | 3/1975 | Bausch et al. | 366/80 |
| 3,981,658 A | * | 9/1976 | Briggs | 425/205 |
| 4,103,355 A | * | 7/1978 | Weber | 366/90 |
| 4,136,968 A | * | 1/1979 | Todd | 366/85 |
| 4,332,481 A | * | 6/1982 | Inoue et al. | 366/84 |
| 4,462,691 A | * | 7/1984 | Boguslawski | 366/80 |
| 4,678,339 A | * | 7/1987 | Peiffer et al. | 366/76.93 |
| 4,752,139 A | * | 6/1988 | Hauck | 366/298 |
| 5,145,251 A | * | 9/1992 | Shirato et al. | 366/80 |
| 5,335,991 A | * | 8/1994 | Wobbe | 366/79 |
| 5,486,328 A | | 1/1996 | Luker | |
| 5,672,005 A | * | 9/1997 | Fukui et al. | 366/75 |
| 5,909,958 A | * | 6/1999 | Rauwendaal | 366/76.2 |
| 6,238,079 B1 | * | 5/2001 | Watada et al. | 366/80 |
| 6,280,074 B1 | * | 8/2001 | Kuroda et al. | 366/76.3 |
| 6,386,748 B1 | * | 5/2002 | Huber et al. | 366/79 |

(Continued)

FOREIGN PATENT DOCUMENTS

JP      02263609  A  * 10/1990

(Continued)

OTHER PUBLICATIONS

Written Opinion and Search report dated Jul. 29, 2009 in corresponding PCT Application No. PCT/US2008/088329, filed on Dec. 24, 2008.

*Primary Examiner*—Charles E Cooley
(74) *Attorney, Agent, or Firm*—Hovey Williams LLP

(57) ABSTRACT

Improved, high Specific Mechanical Energy extrusion systems (20) are provided including a single or twin extruder (22) and an upstream preconditioner (24). The extruder (22) includes an elongated barrel (26) with at least one elongated, axially flighted, rotatable screw assembly (58) therein. The barrel (26) includes a mid-barrel variable restriction valve assembly (32), and the screw assembly (58) has a disrupting/homogenizing screw section (66) therein upstream of the valve assembly (32). The screw section (66) includes a plurality of alternating pitch screw parts (82-92). Preferably, the barrel (26) also has an atmospheric vent (36) downstream of the valve assembly (32).

13 Claims, 8 Drawing Sheets

U.S. PATENT DOCUMENTS

| | | |
|---|---|---|
| 6,607,299 B1 * | 8/2003 | Bacher et al. .................. 366/87 |
| 7,004,616 B2 * | 2/2006 | Murakami et al. ............. 366/75 |
| 2007/0237022 A1 * | 10/2007 | Wiltz et al. .................... 366/80 |
| 2007/0237850 A1 * | 10/2007 | Wiltz et al. ................... 425/114 |
| 2009/0122636 A1 * | 5/2009 | Yamane et al. |
| 2009/0175120 A1 * | 7/2009 | Rokey et al. ................. 366/132 |

FOREIGN PATENT DOCUMENTS

| | | | |
|---|---|---|---|
| JP | 03158220 | | 7/1991 |
| JP | 04014412 | A * | 1/1992 |
| JP | 04022606 | A * | 1/1992 |
| JP | 04022607 | A * | 1/1992 |
| JP | 04028505 | A * | 1/1992 |
| JP | 10305422 | A * | 11/1998 |
| JP | 2000309017 | A * | 11/2000 |

\* cited by examiner

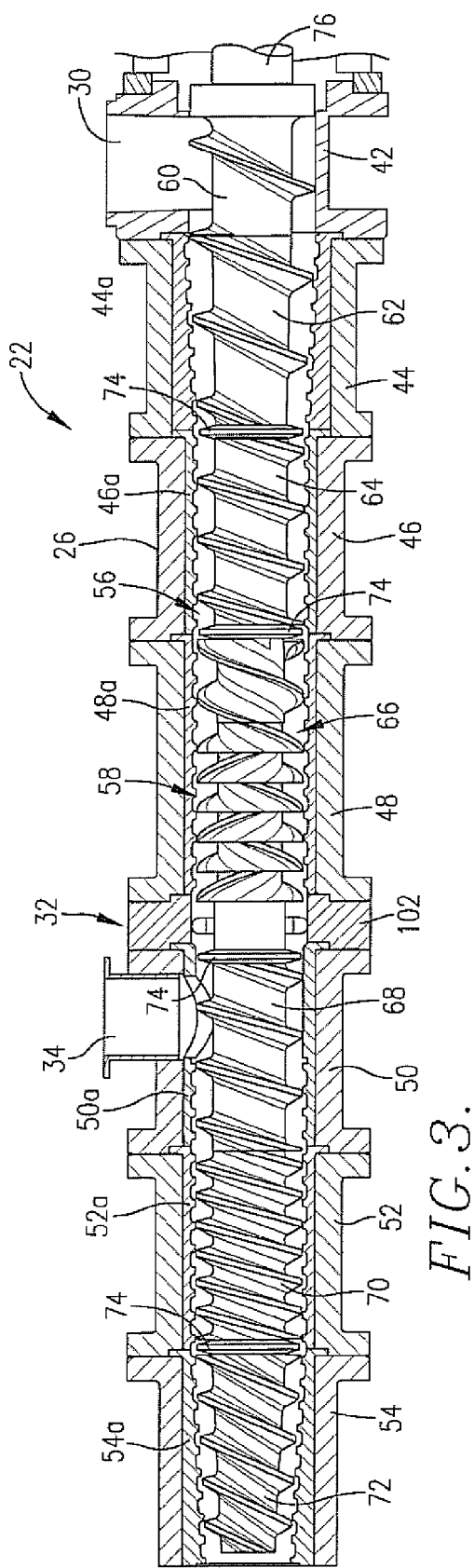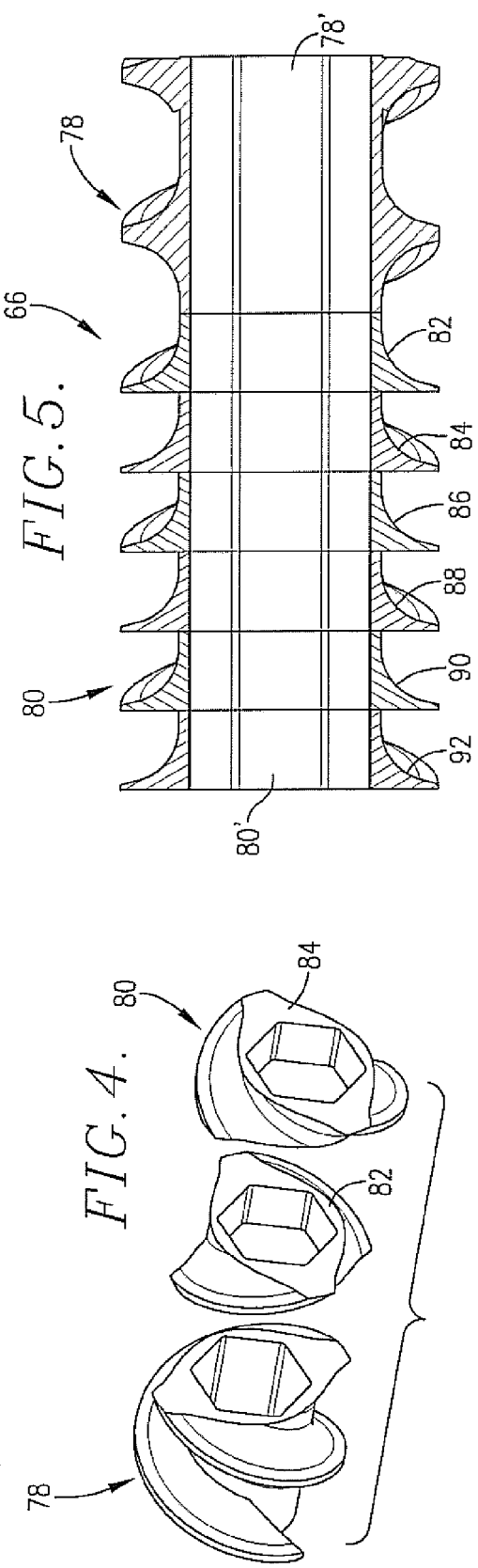

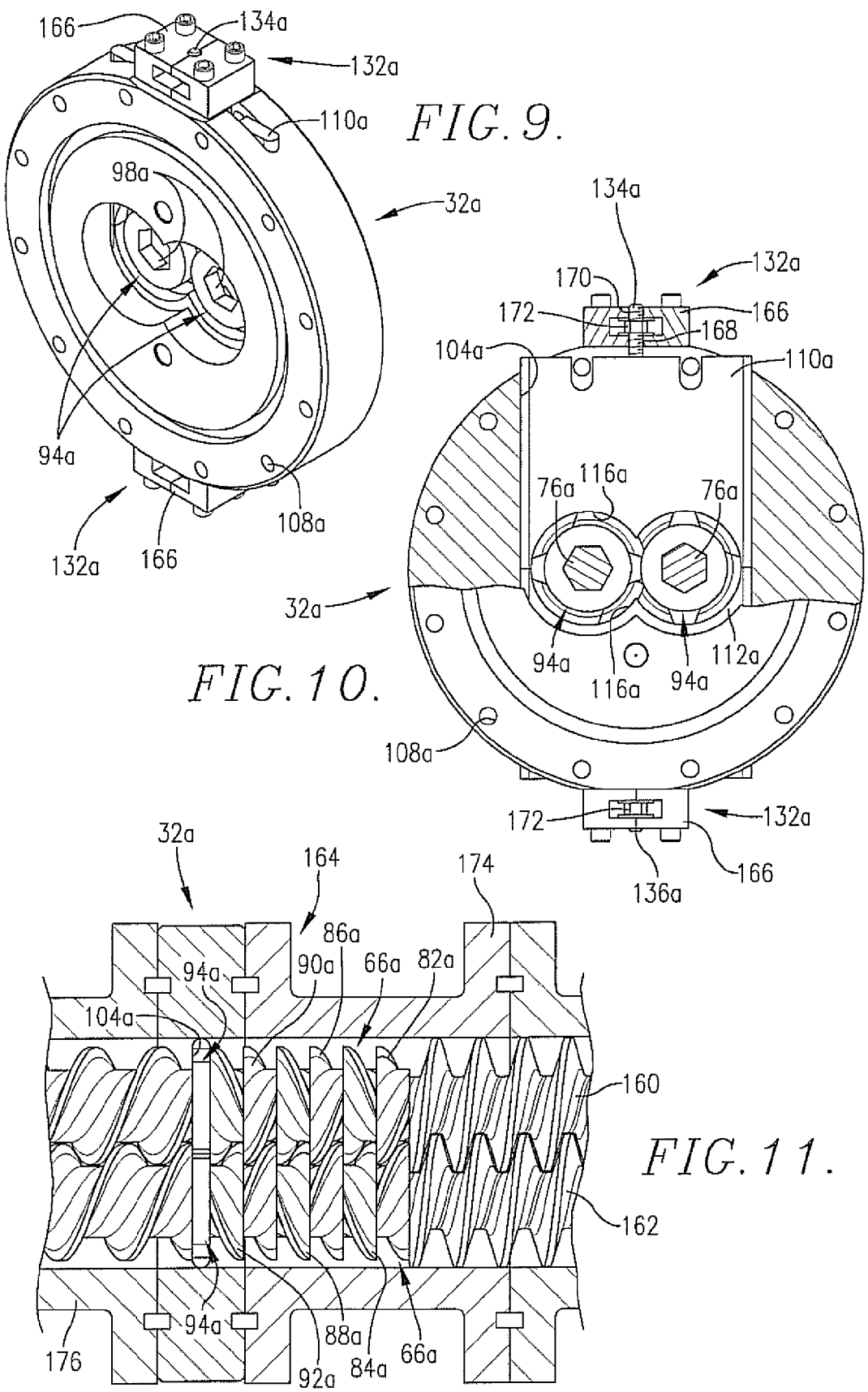

EXTRUDER HAVING VARIABLE MID-BARREL RESTRICTION AND ADJACENT HIGH INTENSITY MIXING ASSEMBLY

BACKGROUND OF THE INVENTION

1. Field of the Invention

The present invention is broadly concerned with improved extrusion assemblies used for the processing of animal feeds or human foods and giving enhanced Specific Mechanical Energy values as compared with conventional extruder designs. More particularly, the invention is concerned with such extrusion assemblies wherein the extruder barrel is equipped with a mid-barrel valve assembly permitting selective, variable flow of material therethrough, together with a disrupting/homogenizing screw section upstream of the valve assembly. In further preferred aspects of the invention an atmospheric vent is provided downstream of the variable valve assembly.

2. Description of the Prior Art

Extrusion systems are commonly used in the production of human foods and animal feeds. Broadly speaking, there are two types of extrusion systems, namely single screw and twin screw systems. As the names imply, single screw extruders include an elongated barrel with only a single, elongated, helically flighted, axially rotatable screw assembly therein. In contrast, twin screw extruders have specially configured barrels with a pair of juxtaposed, helically flighted, axially rotatable and intercalated screw assemblies. It is also quite common to employ a preconditioning device upstream of a single or twin screw extruder, which serves to at least partially cook the starting materials and gelatinized the starch-bearing components thereof. Normally, higher levels of cook and gelatinization are desired inasmuch as this lessens cooking requirements in the downstream extruder, leading to higher quality products and increased throughputs.

A large number of specific extruder configurations have been proposed in the past in an effort to maximize Specific Mechanical Energy (SME) and cook levels without a concomitant increase in energy input by way of thermal energy. To this end, it has been known to use steamlocks along the length of the extruder screw(s) as well as variable valving systems providing both fixed and variable material flow restrictions. While such expedients are common, they have not provided the higher SME and cook values desired by extrusion processors.

There is accordingly a need in the art for improved extrusion assemblies capable of enhancing SME and cook values during the processing of animal feeds or human foods, without the need for significantly increased energy inputs.

SUMMARY OF THE INVENTION

The present invention overcomes the problems outlined above and provides an extrusion assembly (which may be either a single or twin screw extrusion assembly) comprising an elongated barrel having an inlet and a spaced, restricted orifice die outlet, with a mid-barrel valve assembly located along the length of the barrel and including structure for selective, variable restriction of material flow through the valve assembly. The assembly further has at least one elongated, axially flighted screw assembly within the barrel and operable to move material from the inlet, through the barrel and valve assembly and out the die outlet. This screw assembly includes a disrupting/homogenizing screw section upstream of the barrel valve assembly, wherein the disrupting/homogenizing screw section has a plurality of flighted screw parts, with at least one of the screw parts having a right-hand pitch, and at least another of the screw parts having a left-hand pitch. The combined use of a mid-barrel valve assembly together with such a disrupting/homogenizing screw section has proven to give desirable feed or food processing results.

In preferred forms, the screw parts are arranged so that adjacent ones of the screw parts have opposite pitches. Most preferably, the disrupting/homogenizing screw section is immediately adjacent the valve assembly, whereby material exiting the disrupting/homogenizing screw section flows directly into the valve assembly without encountering an additional flighted screw section(s). Also, an atmospheric vent may be provided downstream of the valve assembly, and preferably immediately adjacent the latter. Use of a vent commonly occurs in order to minimize excessive expansion in the final extrudate.

In many cases a preconditioner is provided upstream of the extruder barrel, wherein the preconditioner presents an elongated vessel with a preconditioner inlet and a preconditioner outlet, the preconditioner outlet being operably coupled with the barrel inlet for passage of material from the preconditioner into the barrel. A particularly preferred preconditioner is of the dual-shaft design described in U.S. Pat. No. 4,752,139 (incorporated by reference herein), and having respective variable speed drives for the individual shafts.

BRIEF DESCRIPTION OF THE DRAWINGS

FIG. 3 is a vertical sectional view of the extruder illustrated in FIG. 1, depicting the mid-barrel flow restriction valve assembly in combination with upstream high intensity disrupting/homogenizing screw assembly and a downstream vent;

FIG. 4 is an exploded perspective view illustrating components of the disrupting/homogenizing screw assembly;

FIG. 5 is a vertical sectional view of the disrupting/homogenizing screw assembly;

FIG. 9 is a vertical sectional view of another embodiment of the mid-barrel flow restriction valve assembly of the invention, designed for use with a twin screw extruder;

FIG. 10 is a fragmentary vertical sectional view of the mid-barrel flow restriction valve assembly illustrated in FIG. 9;

FIG. 11 is a fragmentary sectional view illustrating adjacent disrupting/homogenizing screw sections in a twin screw extruder;

DETAILED DESCRIPTION OF THE PREFERRED EMBODIMENT

Figure 1:
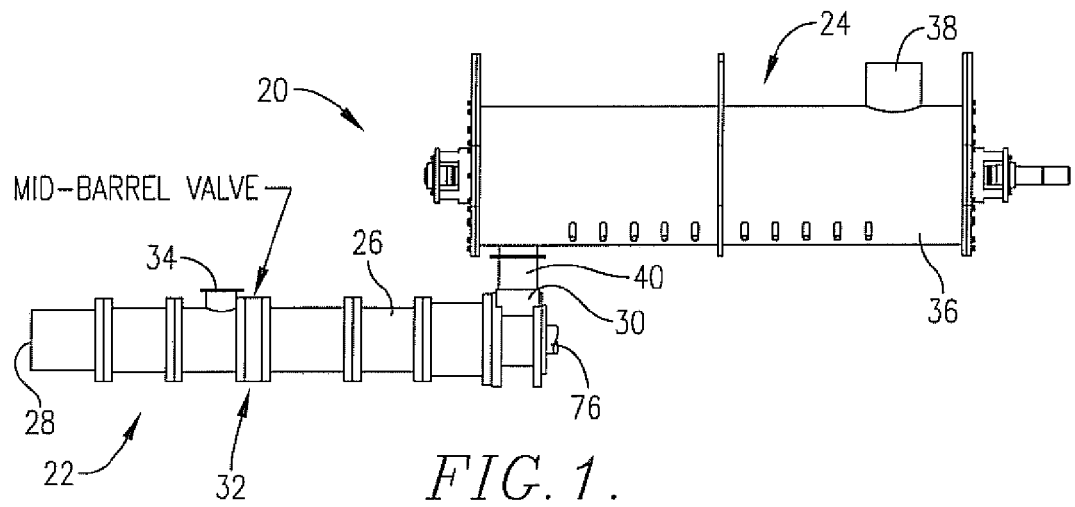
FIG. 1 is a side elevational view of a preferred extruder in accordance with the invention, with an upstream, preferred preconditioner operably coupled with the extruder.

FIG. 1 illustrates an extruder assembly 20 broadly including an extruder 22 and an upstream preconditioner 24. The extruder 22 in the illustrated example is a single screw extruder including an elongated, multiple-section barrel 26 having an endmost, restricted orifice die 28 and an inlet 30. A mid-barrel flow restriction valve assembly (MBV) 32 is interposed between intermediate barrel sections, and a barrel vent 34 is located downstream of assembly 32. The preconditioner 24 includes a dual-chamber housing 36 having an inlet 38 and an outlet 40, the latter coupled with barrel inlet 30. Additionally, it will be seen that intermediate head 50 is equipped with the atmospheric vent 34 downstream of assembly 32.

Referring to FIG. 3, the extruder 22 is depicted in greater detail. The extruder barrel 26 is made up of an inlet head 42 including inlet 30, as well as five intermediate heads 44, 46, 48, 50, and 52, and an outlet head 54. The heads 42-54 are end-to-end interconnected to cooperatively define a central region 56 extending from inlet 30 to die outlet 28. Additionally, it will be seen that the heads 44-54 are equipped with internal, tubular, helically ribbed sleeves 44a-54a. The selectively adjustable mid-barrel valve assembly 32 is sandwiched between heads 48 and 50, although it could be located between any adjacent heads save for the inlet heads. This assembly 32 is of the type illustrated in U.S. Patent Publication No. US 2007/0237850, dated Oct. 11, 2007, and incorporated by reference herein.

The extruder 22 has an elongated, helically flighted screw assembly 58 extending along the length of region 56 and operable to convey material received through inlet 30 along the length of barrel 26 for ultimate extrusion through die 28.

The screw assembly 58 includes a pair of first and second inlet sections 60 and 62, third section 64, a specialized disrupting/homogenizing screw section 66 leading to MBV assembly 32, downstream screw sections 68 and 70 and a final, uncut cone nose screw section 72. Conventional steamlock elements 74 are located between screw sections 62, and 64, 64 and 66, the downstream end of assembly 32 and screw section 68, and between screw sections 70 and 72. The screw sections 60-72 are mounted on hexagonal central shaft 76 (FIG. 7), the latter operably coupled with a conventional drive motor and gear reduction assembly (not shown) for powered rotation of the screw assembly 58.

Specialized screw section 66 includes an inlet section 78 as well as a downstream disrupting/homogenizing section 80. The section 78 is a short screw segment of the type described in detail in co-pending and concurrently filed U.S. Patent Application entitled "Single Screw Extruder for Processing of Low Viscosity Preconditioned Materials,"S/N 11,969,173 incorporated by reference herein. The section 80 includes a plurality of abutting, flighted screw parts 82-92 of alternating pitch, e.g., the part 82 has a right-hand pitch while adjacent part 84 has a left-hand pitch; the individual parts 82-92 are each preferably less than a full pitch or convolution in length. The sections 78 and 80 present hexagonal central bores 78', 80', so as to receive shaft 76. As seen in Fig. 5, each of the screw parts 82-92 present outermost flighting surfaces defining corresponding screw part diameters with the screw parts 82-92 each having a length less the corresponding screw part diameter. As seen in Figs. 3 and 5, there is only a single disrupting/homogenizing screw section 80 within the screw assembly 58, with the remainder of the screw assembly 58 having a common pitch direction.

Figure 2:
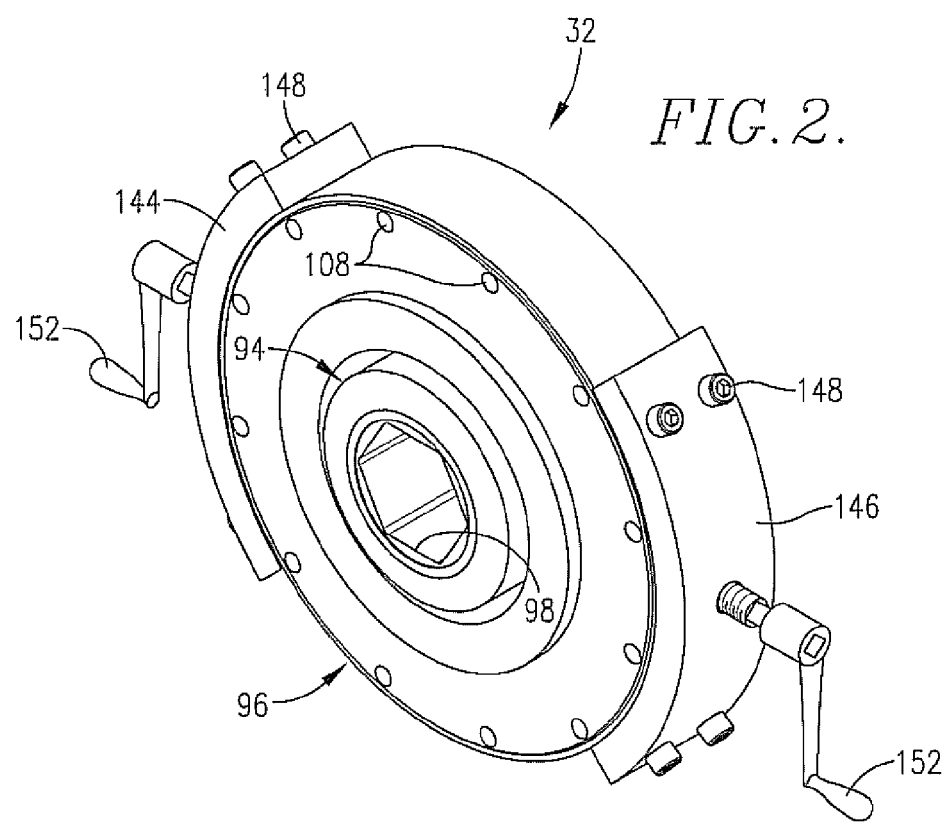
FIG. 2 is a perspective view of a mid-barrel flow restriction valve assembly in accordance with the invention.
Figure 7:
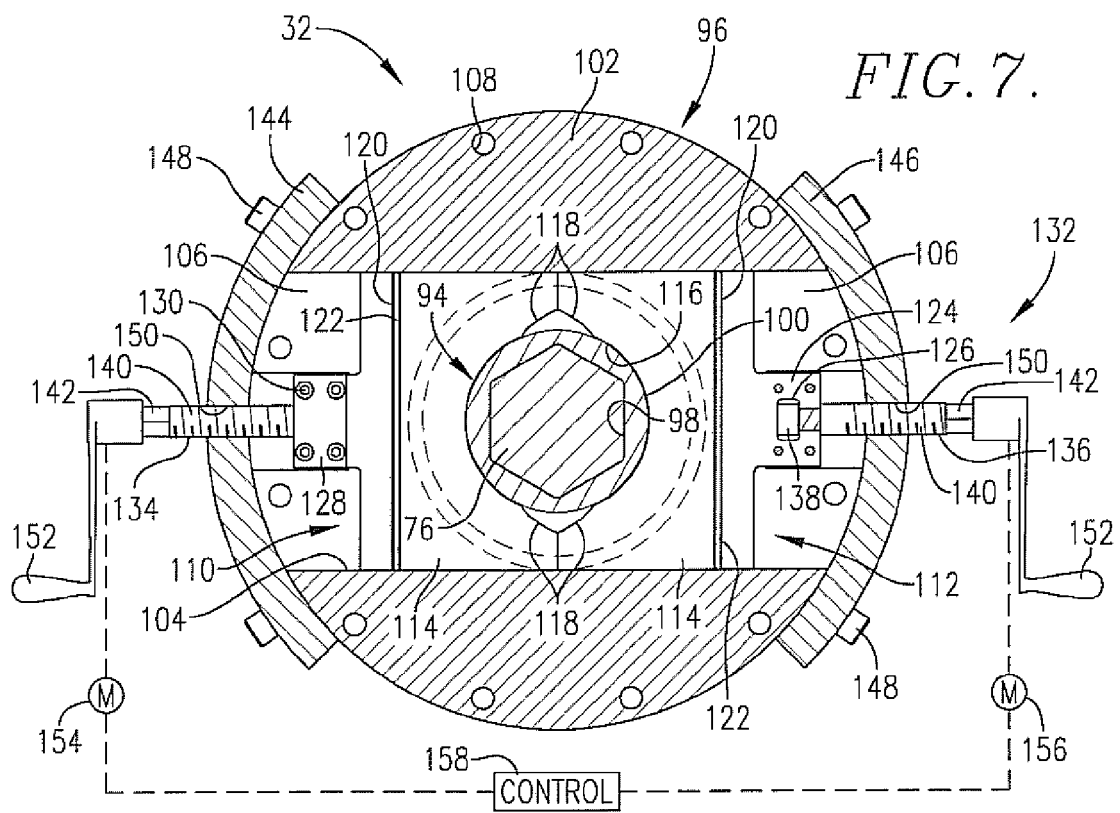
FIG. 7 is a vertical sectional view illustrating the design of the preferred mid-barrel flow restriction valve assembly.

The MBV assembly 32 is illustrated in FIG. 2 and broadly includes a central shearlock element 94 and a mating, outboard restriction unit 96. The assembly 32 is designed for use with a single or twin screw extruder such as depicted in FIGS. 3 and 7 respectively, and is used to provide varying levels of flow restriction through the extruder barrel 26, in order to generate increased levels of back pressure and shear within the extruder 22, increasing the mechanical energy imported to the material being processed.

In detail, the shearlock element 94 of assembly 32 is a solid annular metallic body having a central hexagonal bore 98 designed to receive the shaft 76, with a circular cross section presenting an outermost smooth operating surface 100. As such, the element 94 rotates in unison with shaft 76 and screw assembly 58.

The restriction unit 96 includes a generally circular primary body 102 having a laterally extending through-slot 104 (FIG. 6) presenting a pair of side marginal openings 106. The body 102 is of metallic construction and has a series of axial bores 108 designed to mate with similar bores provided in the head section flanges. Threaded fasteners (not shown) are used to interconnect the body 102 between the adjacent flanges of head sections 48 and 50, so that the body 102 is in effect sandwiched between the aligned head sections 48 and 50.

The assembly 32 also includes a pair of restriction components 110, 112 which are each slidably received within the slot 104. The components 110, 112 are mirror images of each other and the construction thereof is best illustrated in FIG. 7. Thus, it will be seen that each component has a metallic jaw-like body 114 presenting an innermost arcuate surface 116. The central region of each surface 116 is of essentially circular radius close to the radius of element 94, whereas the outboard region of each surface 116 has a pair of endmost, out of round projections 118. Each body 114 is equipped with a circumscribing groove 120 which receives a flexible seal 122. Each body 114 also has an integral, outwardly extending ear 124 having an end notch 126 formed therein. A plate 128 is disposed over the notch 126 and is secured in place by fasteners 130.

Assembly 32 further includes a drive apparatus 132 operatively coupled with the components 110, 112 in order to move these components toward or away from the shearlock element 94 as will be explained. The drive apparatus 132 includes a pair of drive screws 134, 136 having forward butt ends 138, central threaded sections 140, and square drive ends 142. It will be seen that the forward butt end 138 of each drive screw 134, 136 is located within the notch 126 of the associated body 114, with the remainder of the screw extending outwardly.

Figure 6:
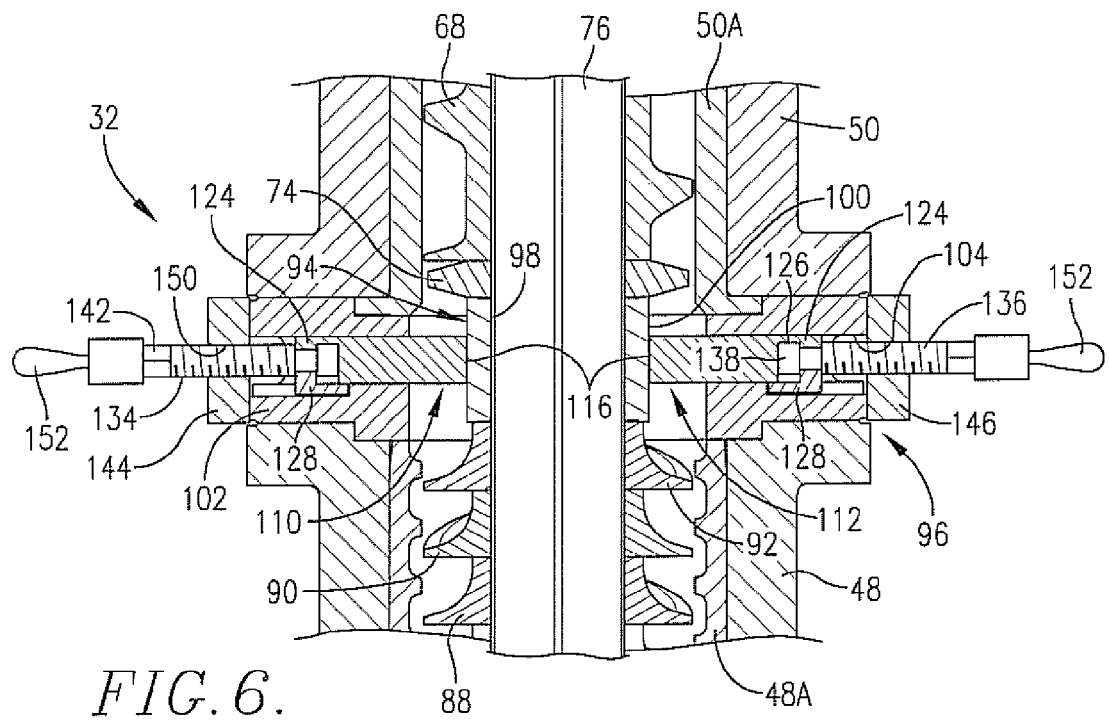
FIG. 6 is a fragmentary, vertical sectional view of the extruder illustrated in FIGS. 1 and 3 and depicting the mid-barrel flow restriction valve assembly and portions of the upstream disrupting/homogenizing screw assembly.

The drive apparatus 132 further includes a pair of arcuate cover plates 144, 146 respectively disposed over a side opening 106, and secured in place by fasteners 148. Each of the plates 144, 146 has a central, threaded bore 150 receiving threaded section 140 of an associated drive screws 134, 136. It will thus be appreciated that rotation of the drive screws 134, 136 serves to slide the component 110, 112 inwardly or outwardly so as to define a selected clearance between the surfaces 116 of the components 110, 112 and the operating surface 100 of shearlock element 94. Such rotational movement of the drive screw 134, 136 can be effected manually through the use of cranks 152 affixed to the drive ends 142. Alternately, and as schematically depicted in FIG. 6, respective motors 154, 156 can be coupled to the drive screws 134, 136 for motorized movement of the restriction components 110, 112. Typically, the motors 154, 156 would be coupled to a controller 158 which may form a part of the overall digital control for the extruder 22.

FIGS. 9 and 10 illustrate a flow restriction assembly 32*a* for use in a twin screw extruder having side-by-side intermeshed and intercalated screws 160, 162 as illustrated in FIG. 11 within an appropriately configured twin screw barrel 164. As illustrated, the outer surfaces of the screw flighting of each extruder screw 160, 162 extends into the confines of the adjacent screw flighting between the outer periphery of the screw flighting and the inner root diameter of the central bodies of the screws. The components of assembly 32*a* are, for the most part, identical with those of assembly 32, and therefore like reference numerals have been used in FIGS. 9-10, except for the distinguishing letter "a." Thus, the assembly 32*a* has a pair of shearlock elements 94*a*, each respectively mounted on one of the hexagonal screw shafts 76*a*. Also, a pair of opposed restriction components 110*a*, 112*a* are provided, preferably mounted in a vertical orientation, as shown. The inner operating surfaces 116*a* of the components 110*a*,112*a* have a pair of juxtaposed arcuate regions so as to simultaneously accommodate and engage both of the shearlock elements 94*a*. In this embodiment, the drive apparatus 132*a* is somewhat different. Specifically, the drive screws 134*a*, 136*a* of the respective components 110*a*, 112*a* are received within a bifurcated drive housing 166 presenting spaced apart bores 168, 170. The central sections of drive screws 134*a*, 136*a* between the bores 168, 170 is equipped with a drive nut 172. Adjustment of the components 110*a*, 112*a* is effected by rotation of the drive nuts 172, thereby serving to move the associated components 110*a*, 112*a* toward and away from the shearlock element 94*a*. From the foregoing discussion, it will be readily appreciated that the components 110*a*, 112*a* move along essentially aligned and rectilinear paths toward and away from the shearlock elements 94*a*, upon rotation of the drive screws 134*a*,136*a*.

FIG. 11 illustrates the assembly 32*a* sandwiched between a pair of twin screw extruder barrel heads 174, 176 making up a part of barrel 164. It will further be seen in FIG. 11 that the screw sections 66*a* upstream of assembly 32*a* are configured in the manner of previously described screw sections 66, i.e., each of the section 66*a* includes alternating, opposite pitch screw parts 82*a*-92*a*.

Figure 12:
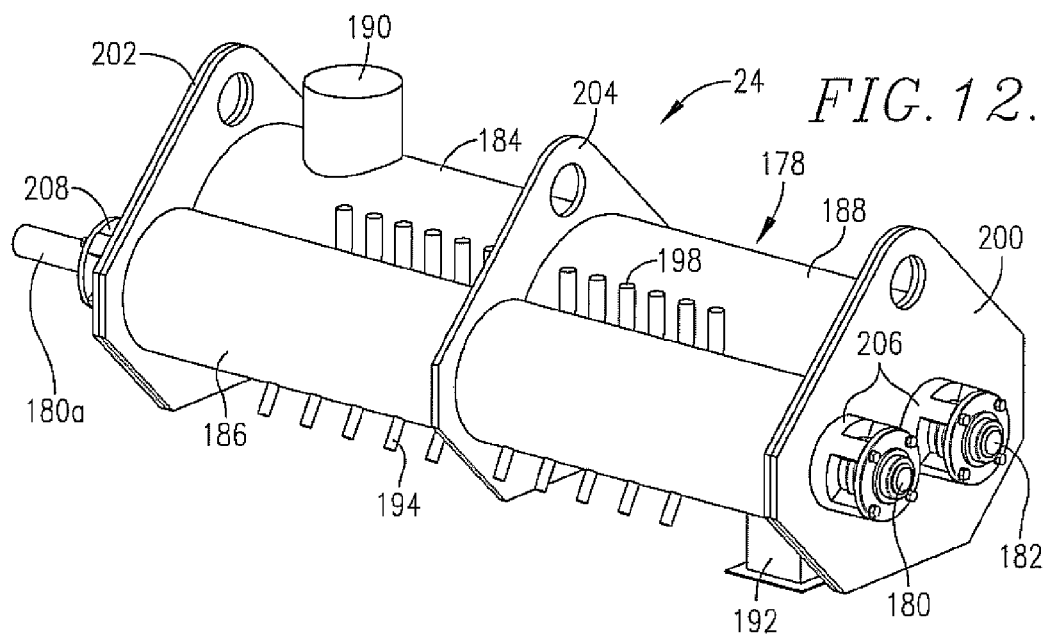
FIG. 12 is a perspective view of the preferred preconditioner for use in the invention.
Figure 13:
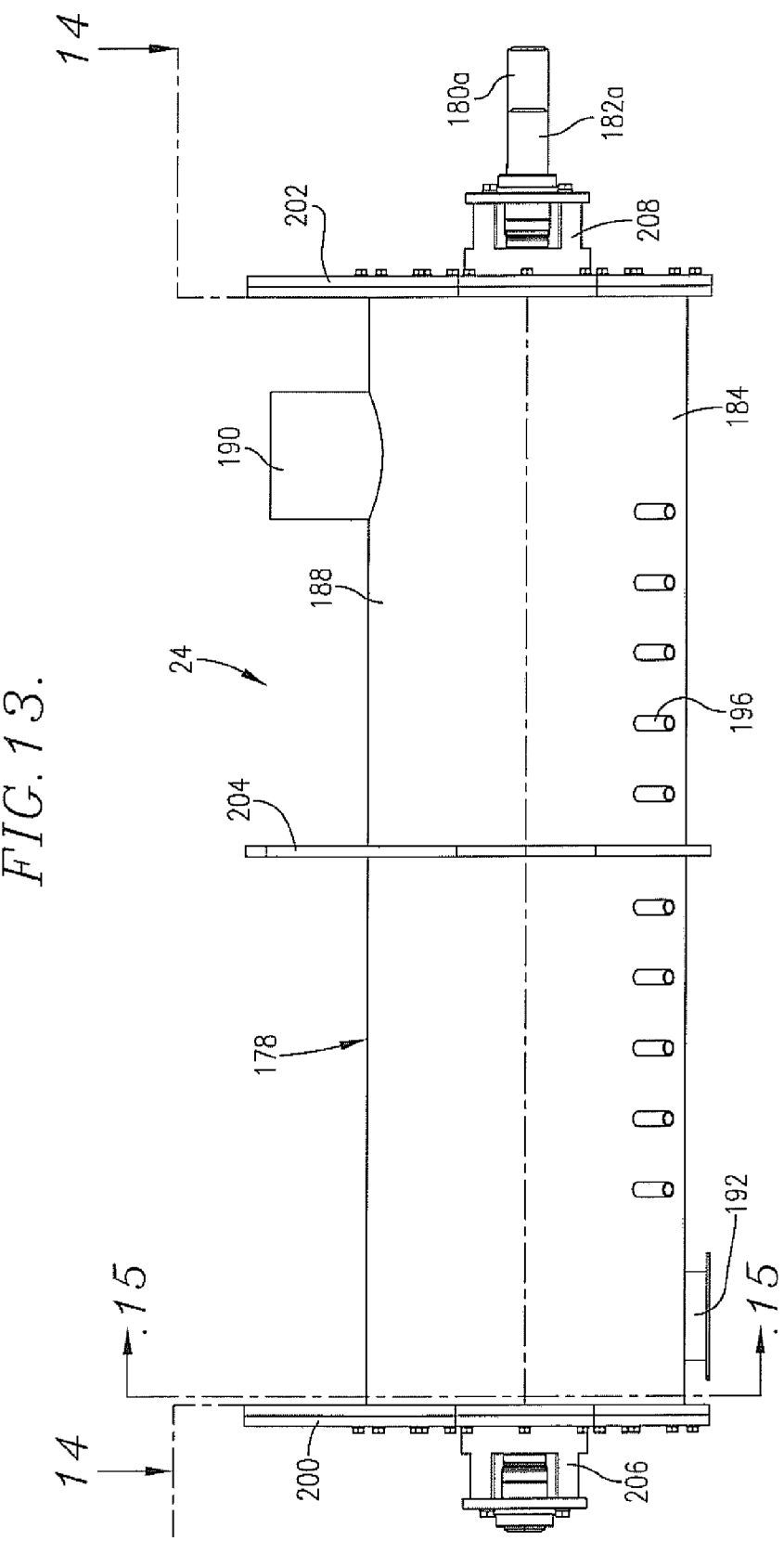
FIG. 13 is a side elevational view of the preconditioner of FIG. 12.
Figure 14:
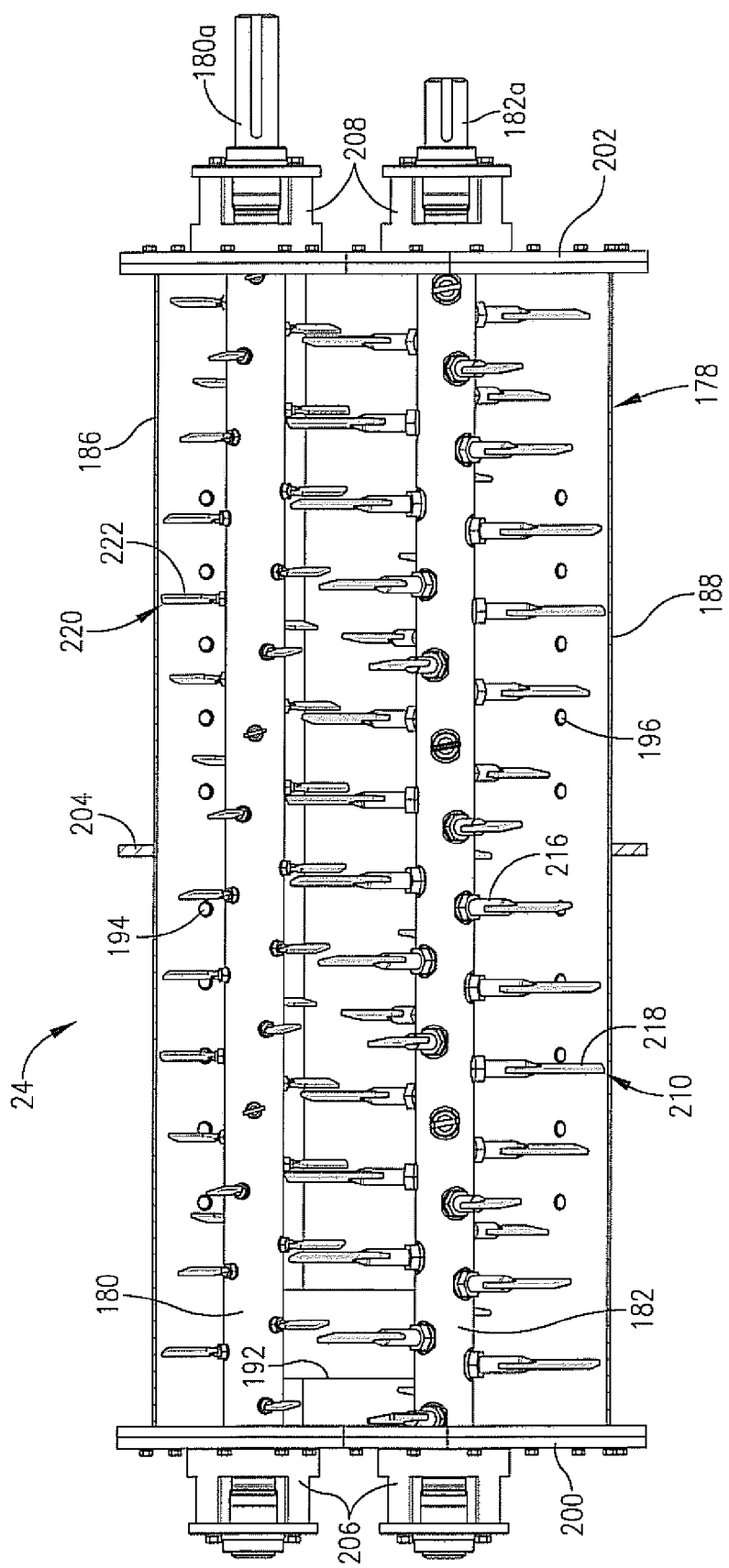
FIG. 14 is a sectional view taken along line 14-14 of FIG. 13 and depicting the internal construction of the preconditioner.

The preconditioner 24 is illustrated in FIGS. 12-14, and is of the type described in co-pending U.S. patent application Ser. No. 11/875,033, filed Oct. 19, 2007, incorporated by reference herein. The preconditioner 24 includes an elongated, dual-stage mixing vessel 178 with a pair of parallel, elongated, axially extending and rotatable mixing shafts 180 and 182 along the length thereof. The shafts 180, 182 are coupled with individual variable drive devices operably coupled with a control device (not shown). The variable drive devices are preferably in the form of variable speed drives (VSD), whereas the controller may be a controller, processor, application specific integrated circuit (ASIC), or any other type of digital or analog device capable of executing logical instructions. The device may even be a personal or server computer such as those manufactured and sold by Dell, Compaq, Gateway, or any other computer manufacturer, network computers running Windows NT, Novel Netware, Unix, or any other network operating system. The VSD drives devices may be programmed as desired to achieve the ends of the invention, e.g., they may be configured for different rotational speed ranges, rotational directions and power ratings.

The vessel 178 has an elongated, transversely arcuate sidewall 184 presenting a pair of elongated, juxtaposed, interconnected chambers 186 and 188, as well as a material inlet 190 and a material outlet 192. The chamber 188 has a larger cross sectional area than the adjacent chamber 186, which is important for reasons to be described. Each of the chambers 186, 188 is equipped with a series of spaced apart inlet ports 194, 196 along the lengths of the corresponding chambers, and an intermediate set of ports 198 is located at the juncture of the chambers 186, 188. These ports 194-198 are adapted for connection of water and/or steam injectors leading to the interiors of the chambers. The overall vessel 178 further has fore and aft end plates 200 and 202, as well as, a central plate 204.

As illustrated, the shafts 180, 182 are essentially centrally located within the corresponding chambers 186, 188. To this end, forward bearings 206 mounted on plate 200 support the forward ends of the shafts 180, 182, and similarly rear bearings 208 secured to plate 202 support the rear ends of the shafts. The shafts 180, 182 have rearwardly extending extensions 180*a*, 182*a* projecting from the bearings 208 to provide a connection to the variable frequency drives previously described.

Figure 15:
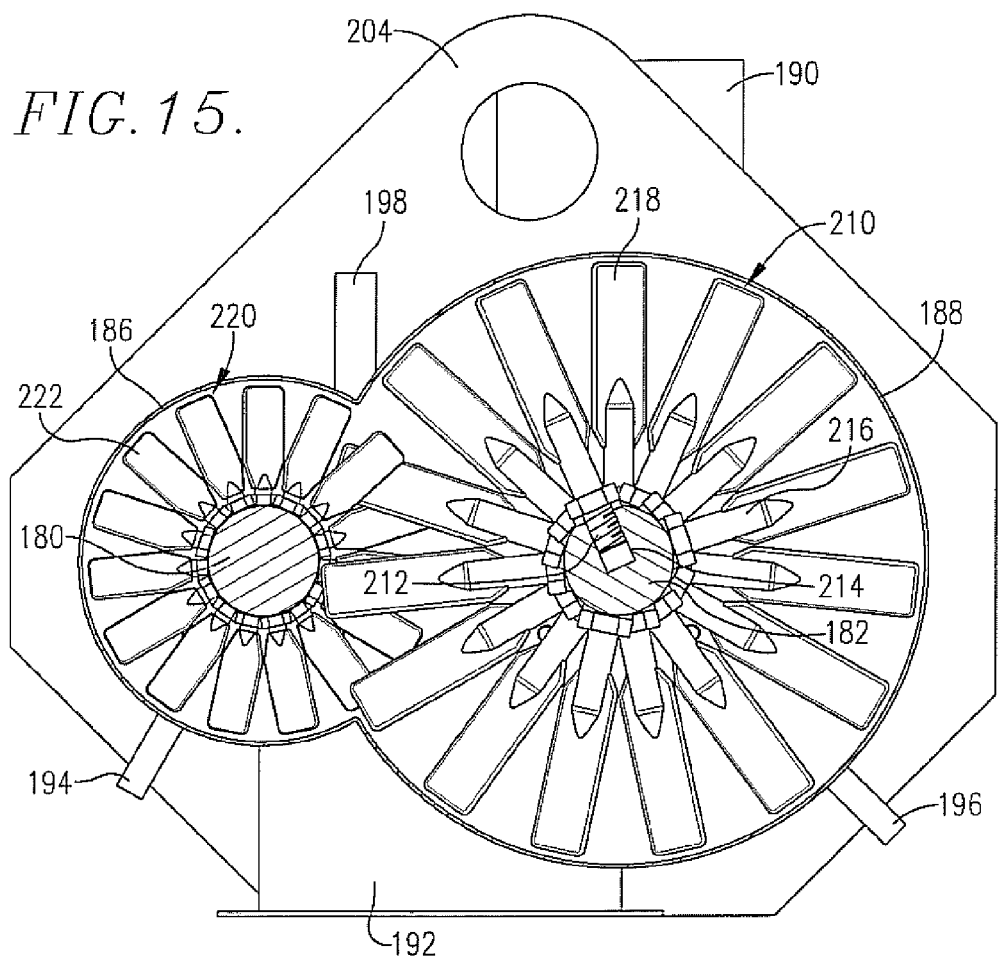
FIG. 15 is a sectional view taken along line 15-15 of FIG. 13 and further illustrating the construction of the preconditioner.

The shaft 182 is equipped with a plurality of radially outwardly extending mixing elements 210 located in staggered relationship along the length of the shaft. Each of the elements 210 (FIG. 15) includes a threaded inboard segment 212 received within a correspondingly threaded bore 214 of the shaft 182, with an outwardly projecting segment 216 having a substantially flat, paddle-like member 218. As best seen in FIG. 14, the paddle members 218 of the mixing elements 210 are oriented in a reverse direction relative to the direction of travel of material from inlet 190 to outlet 192. That is, these members serve to retard the flow of material through the preconditioner 24.

The shaft 180 situated within smaller chamber 186 likewise has a series of mixing elements 144 along the length thereof in alternating, staggered relationship. The elements 220 are identical with the elements 210, save that the elements 220 are somewhat smaller in size. Each element 220 presents an outboard paddle-like member 222. In this case, the members 220 are oriented opposite that of the members 210, i.e., they are oriented in a forward direction so as to more positively advance the flow of material from inlet 190 toward and out the outlet 192.

Adjacent pairs of mixing elements 210 and 220 are axially offset from each other and are intercalated; thus the elements are not of self-wiping design. This allows the shafts to be rotated at greatly different rotational speeds, while avoiding any potential lock-up owing to mechanical interference between the elements 210 and 220.

The preconditioner designs of the present invention permit processing of materials to a greater degree than heretofore possible. For example, prior preconditioners of the type described in U.S. Pat. No. 4,752,139 could not be field-adjusted to achieve different relative rotational speeds between the shafts thereof. That is, in such prior preconditioners, once a rotational speed differential was established during manufacture of the device, it could not thereafter be altered without a complete reconstruction of the device. Normal preconditioners of this type had a speed differential of 2:1 between the shafts within the small and large chambers, respectively. In the present invention, however, far greater and infinitely adjustable speed differentials can be readily accomplished. Thus, in preferred forms the speed differential between the shafts 180, 182 is at least 5:1, and typically ranges from 3:1 to 18:1, with the smaller chamber shaft 180 normally rotating at a speed greater than that of the larger chamber shaft 182. This latter differential corresponds to a rotational speed of 900 rpm for the shaft 180, and 50 rpm for the shaft 182.

This enhanced design affords a number of processing advantages. To give one example, in the prior preconditioner design of the '139 patent, the maximum degree of cook achievable was normally about 30%, with a maximum of about 43% (measured by gelatinization of starch components according to the method described in Mason et al., *A New Method for Determining Degree of Cook*, 67th Annual Meeting, American Association of Cereal Chemists (Oct. 26, 1982), incorporated by reference herein). With the present invention however, significantly greater cook percentages can be achieved, of at least 50% and more preferably at least 55%, and most preferably at least about 75%. At the same time, these enhanced cook values are obtained with the same or even shorter residence times as compared with the prior preconditioners; specifically, such prior designs would require a retention time of from about 160-185 seconds to obtain maximum cook values, whereas in the present preconditioners the retention times are much less, on the order of 120-150 seconds, to achieve this same cook. Further, if the longer typical preconditioner residence times are used, the extent of cook values are normally significantly increased.

Figure 8:
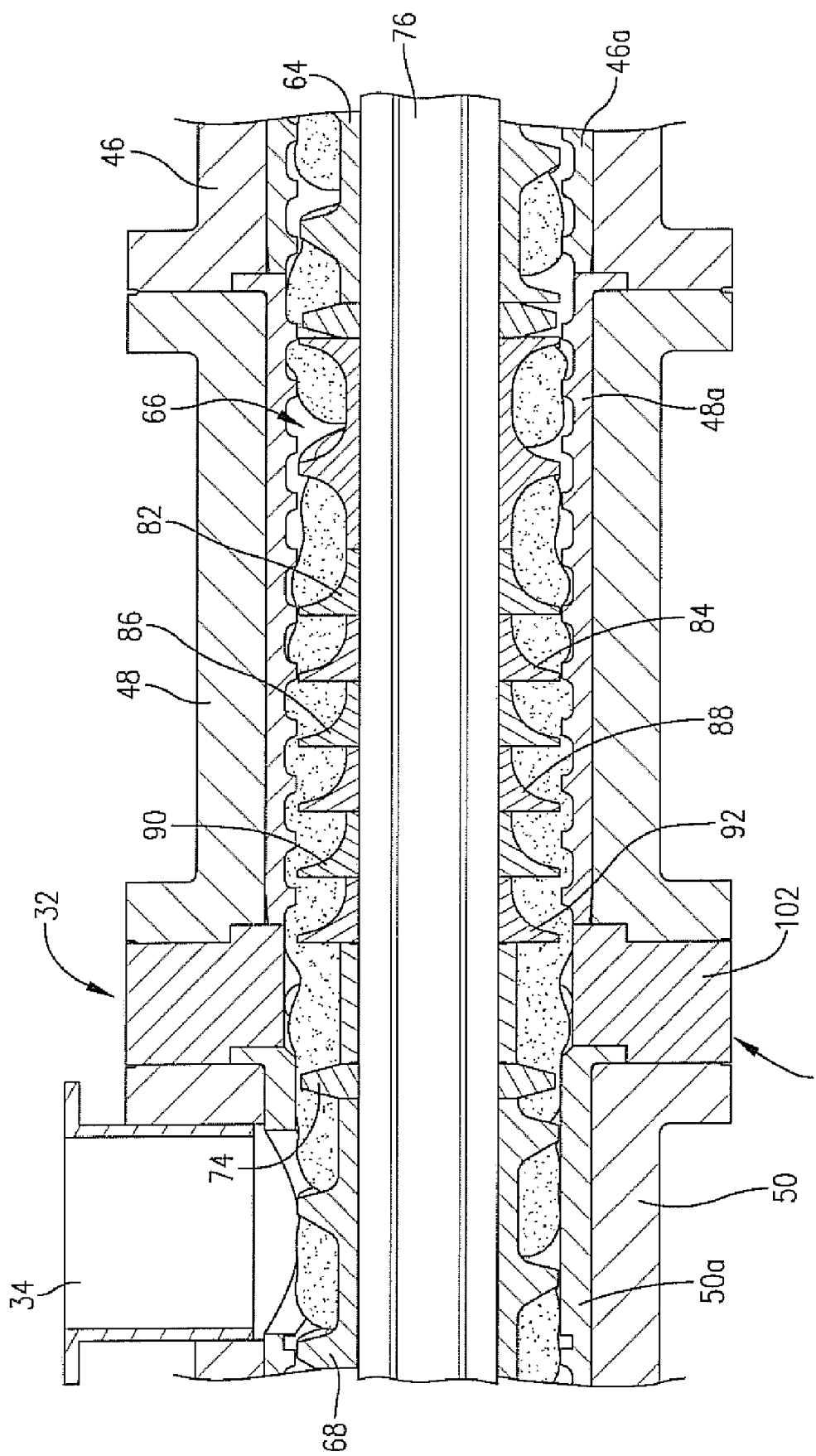
FIG. 8 is a fragmentary, vertical sectional of the extruder illustrated in FIGS. 1 and 3 and showing the operation of the extruder during the processing of materials.

The combined use of a mid-barrel valve in conjunction with an upstream disrupting/homogenizing screw section gives a number of unexpected advantages. Referring to FIG. 8, the action of the disrupting/homogenizing screw section 66 is illustrated. Thus, the material passing through the extruder barrel is cut and disrupted by the screw parts 82-92 with the effect that the material is in a "full choke" condition (i.e., the material completely fills the free volume between the screw assembly 58 and the barrel head 48) as it enters the mid-barrel valve assembly 32 and vented head 50. This has been found to give significantly increased Specific Mechanical Energy (SME) values, as compared with conventional extruder designs. SME value enhancements on the order of 10-25% can be obtained using the invention, without increasing thermal energy inputs.

Another advantage of the preferred mid-barrel valve is that it provides a degree of flexibility not found with standard extruder configurations. For example, the valve may be maintained in a full-open position if desired with certain type of products, without the need for changing the extruder screw or barrel configuration. Thus, use of the mid-barrel valve allows a processor to have only a single extruder, but can property process a wider variety of materials.

The following example sets forth a preferred apparatus and method in accordance with the invention. It is to be understood, however, that this example is provided by way of illustration only, and should not be taken as a limitation on the overall scope of the invention.

EXAMPLE

In this example, two different salmon feed recipes were processed using a standard 7-head single screw extruder setup (runs 1 and 3) versus a 7-head single screw setup identical with the standard setup except for the provision of alternating pitch disrupting/homogenizing screw parts as illustrated in FIG. 3 in the fourth head (runs 2 and 4). Each setup included a mid-barrel valve of the type illustrated in FIG. 2 between the fourth and fifth heads, with a vacuum vent immediately downstream of the valve. A standard model 16 Wenger DDC preconditioner upstream of the extruder was used in each test. The products were processed by initial preconditioning with addition of steam and water, followed by extrusion with steam and water injection. In these runs, the extruder heads were temperature-controlled by passing water through the external jackets of the heads.

The first recipe used in runs 1 and 2 comprised 19.8% by weight cereal grain, 19.6% by weight functional plant protein, and 60.6% by weight non-functional animal protein. The specific recipe was: wheat, 19.8% by weight; steam dried fish meal, 29.6% by weight; hydrolyzed feather meal, 21.2% by weight; soybean meal, 14% by weight; poultry meal, 9.8% by weight; and corn gluten meal, 5.6% by weight. The second recipe used in runs 3 and 4 comprised 21.5% by weight cereal grains, 20.3% by weight functional plant protein, and 58.2% by weight nonfunctional animal protein. The specific recipe was: steam dried fish meal, 33.7% by weight; hydrolyzed feather meal, 18.4% by weight; soybean meal, 11.5% by weight; poultry meal, 6.1% by weight; corn gluten meal, 2.7% by weight; wheat, 21.5% by weight; and wheat gluten, 6.1%.

The results of these tests are set forth below in the following Table.

TABLE

| | Units | Run 1 | Run 2 | Run 3 | Run 4 |
|---|---|---|---|---|---|
| DRY RECIPE INFORMATION: | | | | | |
| Dry Recipe Density | kg/m³ | 544 | 544 | 544 | 544 |
| Dry Recipe Rate | kg/hr | 1514 | 1497 | 1497 | 1496 |
| Feed Screw Speed | rpm | 32 | 32 | 32 | 32 |
| PRECONDITIONING INFORMATION: | | | | | |
| Preconditioner Speed | rpm | 250 | 250 | 250 | 250 |
| Steam Flow to Preconditioner | kg/hr | 88 | 87 | 134 | 134 |
| Water Flow to Preconditioner | kg/hr | 151 | 148 | 174 | 181 |
| Preconditioner Discharge Temp | °C. | 73 | 75 | 82 | 82 |
| Moisture Entering Extruder | % wb | 22.68 | 20.25 | 24.22 | 23.32 |
| EXTRUSION INFORMATION: | | | | | |
| Extruder Shaft Speed | rpm | 478 | 478 | 478 | 478 |
| Extruder Motor Load | % | 37 | 41 | 45 | 48 |
| Steam Flow to Extruder | kg/hr | 63 | 59 | | |
| Water Flow to Extruder | kg/hr | 59 | 61 | 44 | 45 |
| Control/Temperature 1st Head[1] | °C. | 60/60 | 60/60 | 60/60 | 60/49 |
| Control/Temperature 2nd Head[1] | °C. | 70/70 | 70/72 | 70/63 | 70/66 |
| Control/Temperature 3rd Head[1] | °C. | 70/73 | 70/74 | 70/72 | 70/72 |
| Control/Temperature 4th Head[1] | °C. | 80/84 | 80/83 | 80/75 | 80/74 |
| Control/Temperature 5th Head[1] | °C. | 90/88 | 90/90 | 90/90 | 90/89 |
| Head/Pressure | kPa | 1379 | 551.6 | 344.75 | 344.75 |
| Knife Drive Speed | rpm | 1310 | 1286 | 1273 | 1248 |
| FINAL PRODUCT INFORMATION: | | | | | |
| Extruder Discharge Moisture | % wb | 23.32 | 23.88 | 23.01 | 22.15 |
| Extruder Discharge Density | kg/m³ | 417 | 400 | 430 | 424 |
| Dryer Discharge Density | kg/m³ | 404 | | 433 | 435 |
| Dryer Discharge Moisture | % wb | 5.79 | 6.51 | 6.5 | 5.81 |

[1] "Control" refers to the temperature of the incoming water fed through the external jackets of the extruder heads; "Temperature" refers to the actual temperature measured at the extruder heads.

In run 1 the SME value was 45 kw-hr/mt. During the run the mid-barrel valve was 100% closed, the vent was 25% open, and the vent pressure was 2 psi. In run 2 the SME value was 52 kw-hr/mt, the valve was 100% closed, the vent was 10% open, and the vent pressure was 15 psi. In run 3 the SME value was 55.5 kw-hr/mt, the valve was 100% closed, the vent was 10% open, and the vent pressure was 0 psi. In run 4 the SME value was 60 kw-hr/mt, the valve was 100% closed, the vent was 10% open, and the vent pressure was 10 psi.

These runs demonstrated the valuable effects obtained using the disrupting/homogenizing elements. The comparative extruder runs numbers 2 and 4 were substantially uniform and produced good quality extrudates. Moreover, these runs had an increase in SME of 16 and 9%, respectively even though the conditions were substantially the same and extrudate densities were similar.

We claim:

1. An extruder assembly comprising:
   an elongated barrel having an inlet and a spaced, restricted orifice die outlet;
   a mid-barrel valve assembly located along the length of said barrel and including structure for selective restriction of material flow through the valve assembly; and
   at least one elongated, axially flighted screw assembly within said barrel and operable to move material from said inlet, through said barrel and valve assembly and out said die outlet,
   said screw assembly including a disrupting/homogenizing screw section upstream of said valve assembly operable to create a full choke of material, said disrupting/homogenizing screw section including a plurality of lighted screw parts presenting outermost flighting surfaces defining corresponding screw part diameters, with at least one of said screw parts having a right-hand pitch, and at least another of said screw parts having a left-hand pitch, each of said screw parts having a length less than a full pitch and less than the corresponding screw part diameter.

2. The extruder assembly of claim 1, wherein adjacent ones of said screw parts have opposite pitches.

3. The extruder assembly of claim 1, including an atmospheric vent downstream of said valve assembly.

4. The extruder assembly of claim 3, said vent being located immediately downstream of said valve assembly.

5. The extruder assembly of claim 1, said disrupting/homogenizing screw section being immediately adjacent said valve assembly whereby material exiting the disrupting/homogenizing screw section flows directly into said valve assembly without encountering an additional lighted screw section.

6. The extruder assembly of claim 1, including a preconditioner upstream of said extruder barrel, said preconditioner presenting an elongated vessel with a preconditioner inlet and a preconditioner outlet, said preconditioner outlet operably coupled with said barrel inlet for passage of material from the preconditioner into said barrel.

7. The extruder assembly of claim 6, said preconditioner comprising:
   said vessel having a pair of juxtaposed, intercommunicated sections, one of said sections having a greater diameter than the other of said sections; and
   a pair of elongated mixing shafts each having a plurality of mixing elements, said shafts located in laterally spaced apart relationship within a respective section of said vessel.

8. The extruder assembly of claim 1, said extruder barrel being a single screw extruder barrel, there being a single screw assembly within said barrel.

9. The extruder assembly of claim 1, said extruder barrel being a twin screw extruder barrel, there being a pair of adjacent screw assemblies within said barrel.

10. The extruder assembly of claim 1, said extruder assembly being a food extruder.

11. The extruder assembly of claim 1, there being more than two of said screw parts, and being in face-to-face adjacency.

12. The extruder assembly of claim 11, there being a total of six of said screw parts.

13. The extruder assembly of claim 1, there being only a single disrupting/homogenizing screw section within said screw assembly, the remainder of said screw assembly having a common pitch direction.

* * * * *